Figure 3:
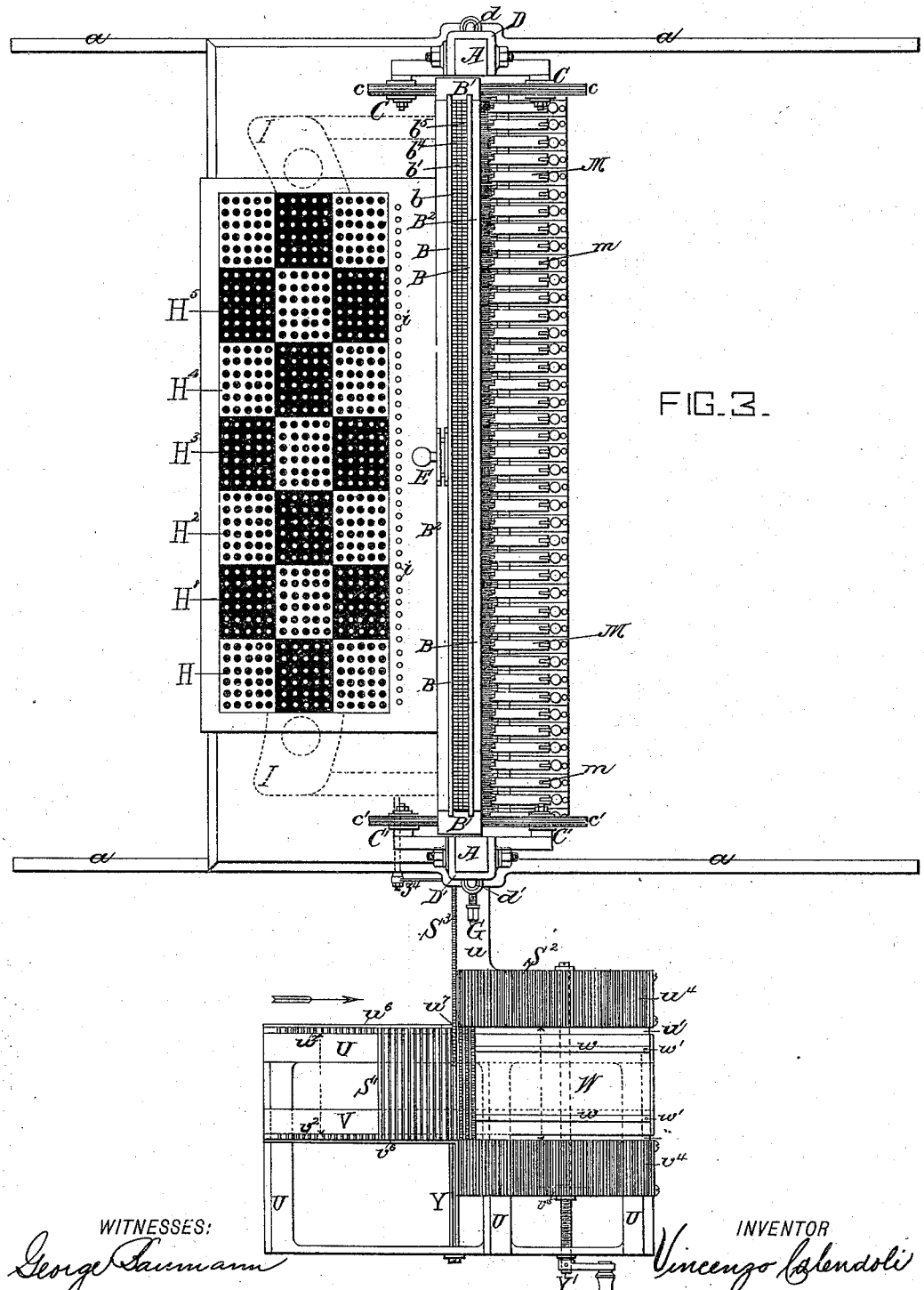

(No Model.) 7 Sheets—Sheet 1.
V. CALENDOLI.
SIMULTANEOUS TYPE SETTING MACHINE.
No. 552,745. Patented Jan. 7, 1896.
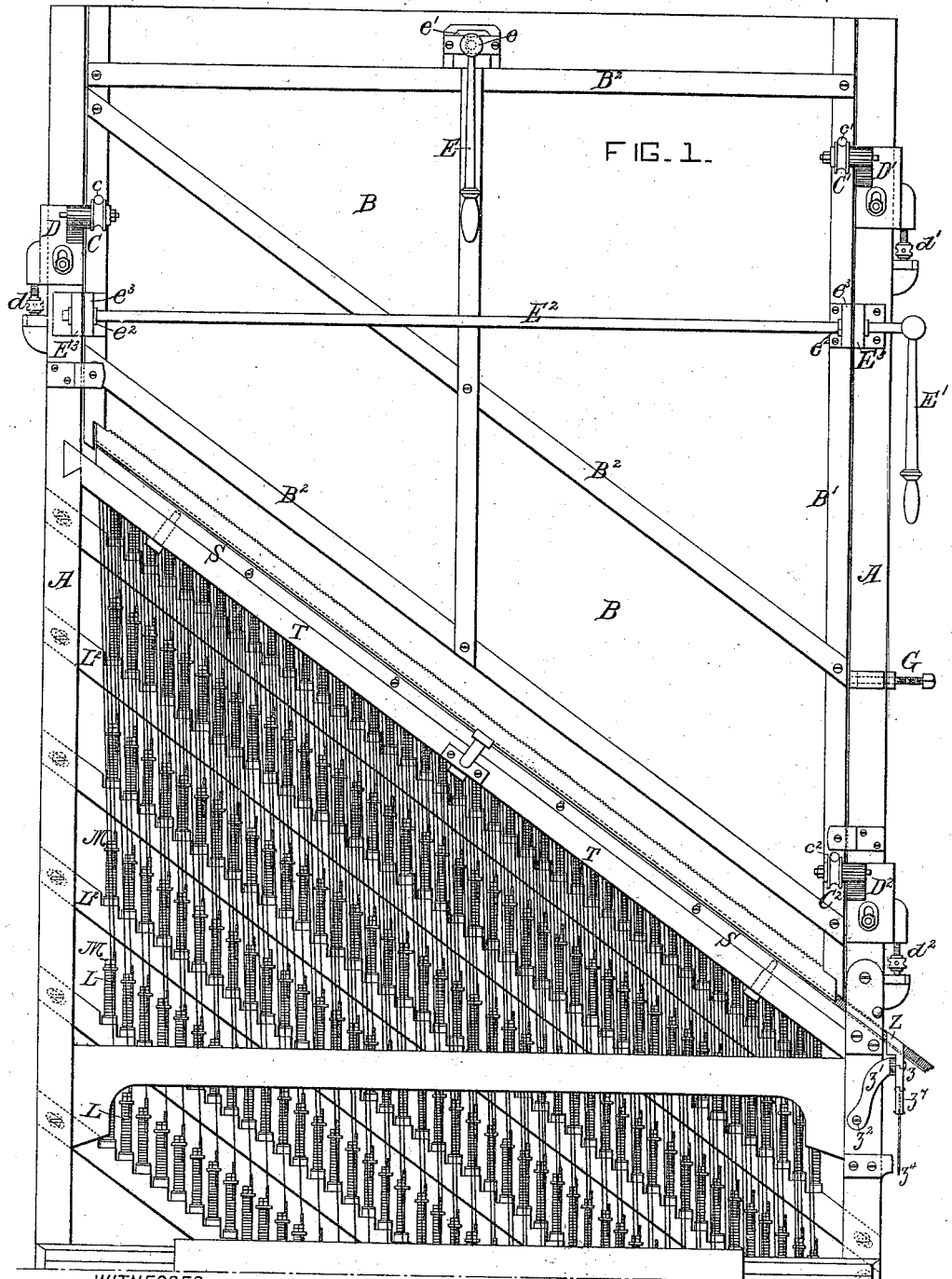

(No Model.) 7 Sheets—Sheet 2.
V. CALENDOLI.
SIMULTANEOUS TYPE SETTING MACHINE.
No. 552,745. Patented Jan. 7, 1896.
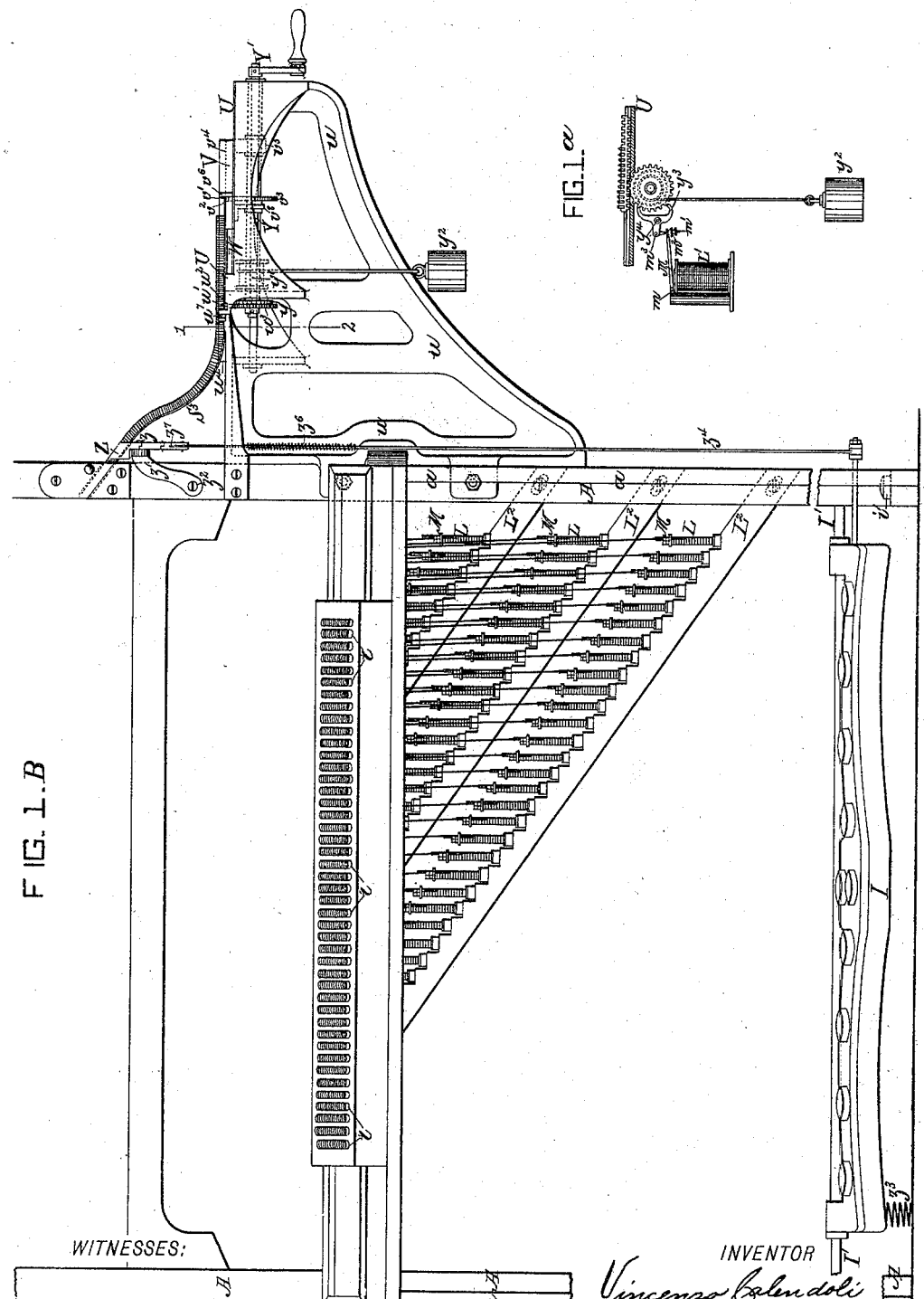

(No Model.) 7 Sheets—Sheet 3.
V. CALENDOLI.
SIMULTANEOUS TYPE SETTING MACHINE.
No. 552,745. Patented Jan. 7, 1896.
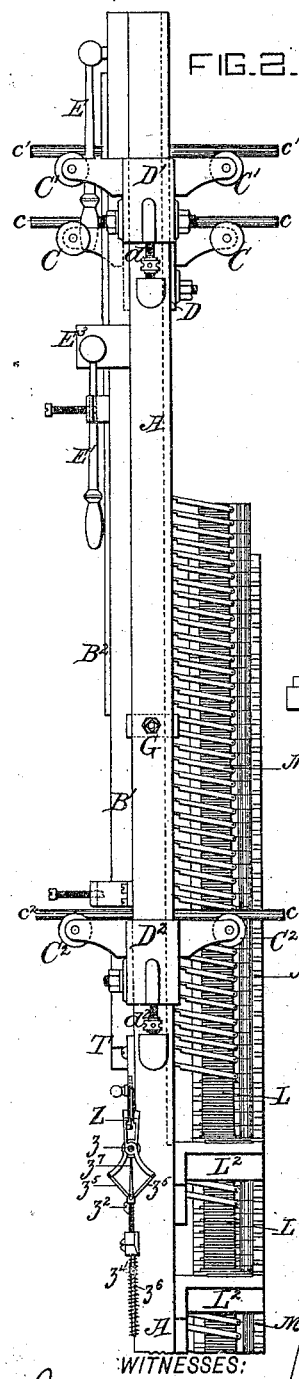
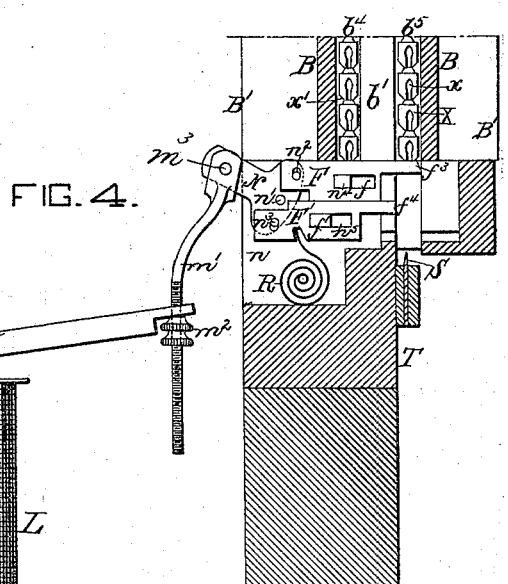
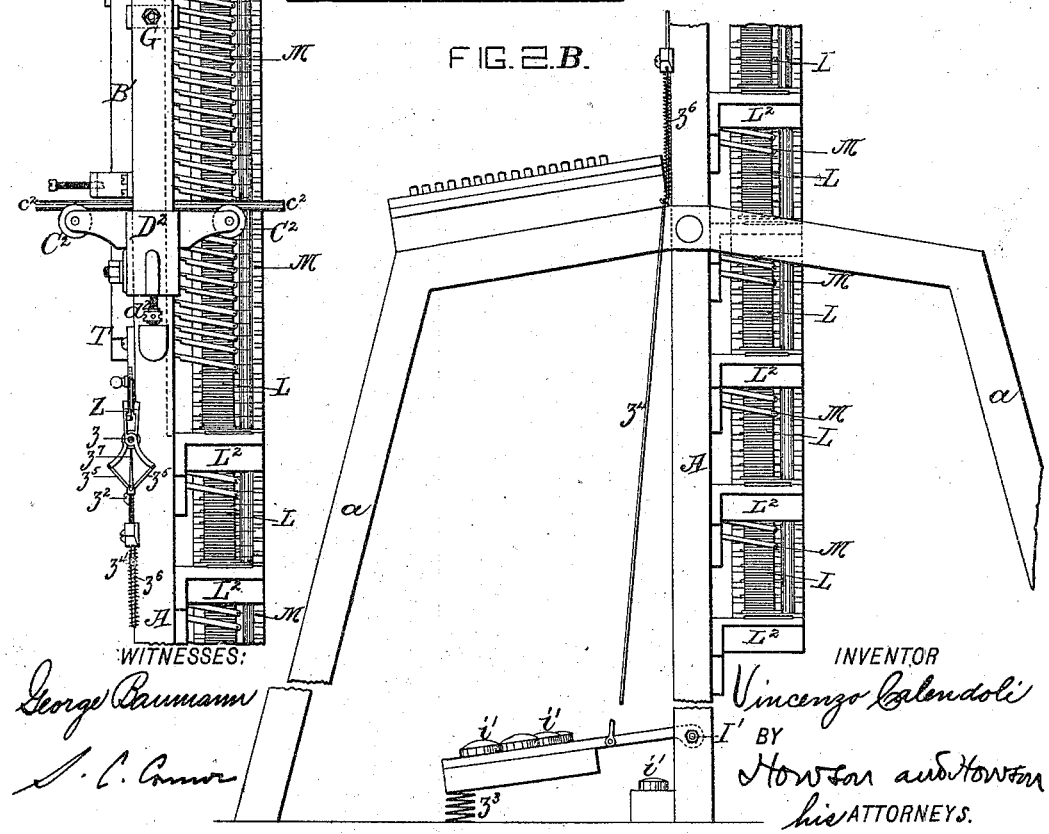

(No Model.) 7 Sheets—Sheet 4.

V. CALENDOLI.
SIMULTANEOUS TYPE SETTING MACHINE.

No. 552,745. Patented Jan. 7, 1896.

WITNESSES:
George Baumann
J. C. Connor

INVENTOR
Vincenzo Calendoli
BY Howson and Howson
his ATTORNEYS.

(No Model.)  7 Sheets—Sheet 5.
V. CALENDOLI.
SIMULTANEOUS TYPE SETTING MACHINE.
No. 552,745. Patented Jan. 7, 1896.
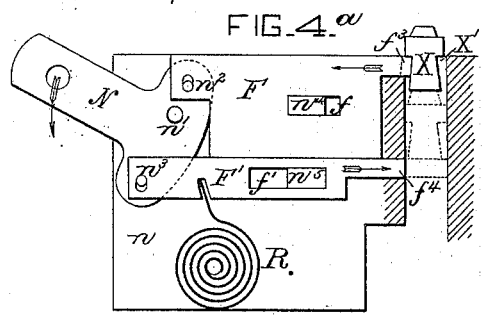
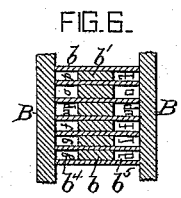
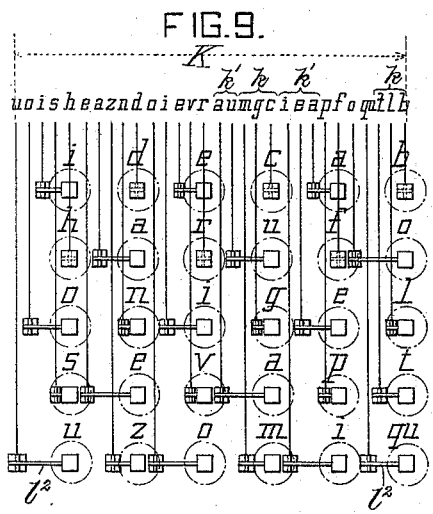
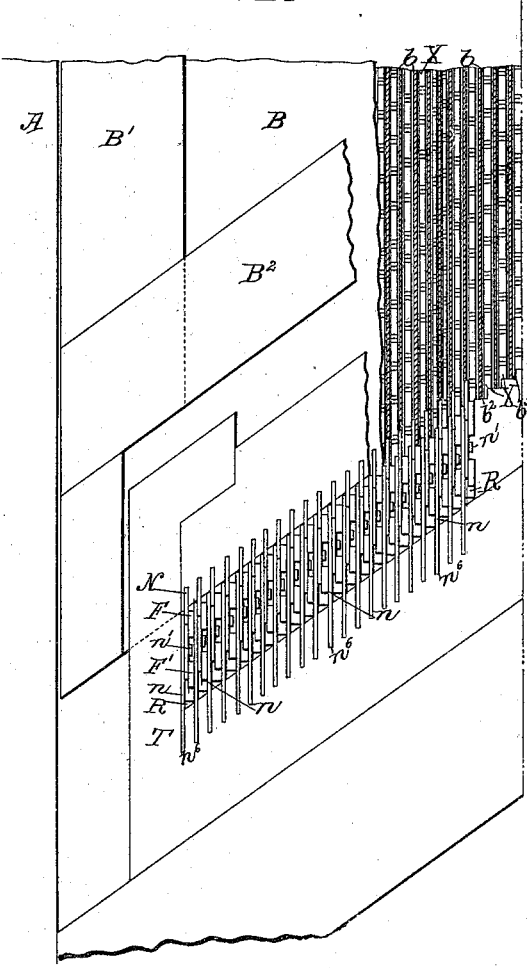
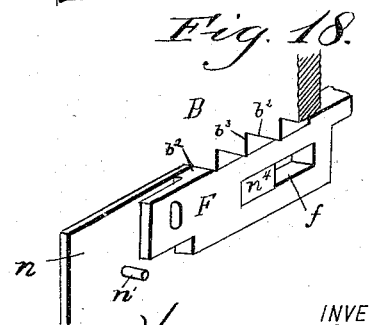
WITNESSES:
George Baumann
S. C. Connor
INVENTOR
Vincenzo Calendoli
BY
Howson and Howson
his ATTORNEYS.

(No Model.) 7 Sheets—Sheet 6.
V. CALENDOLI.
SIMULTANEOUS TYPE SETTING MACHINE.
No. 552,745. Patented Jan. 7, 1896.
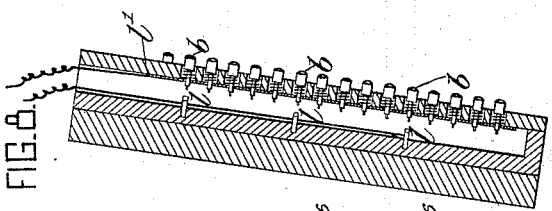
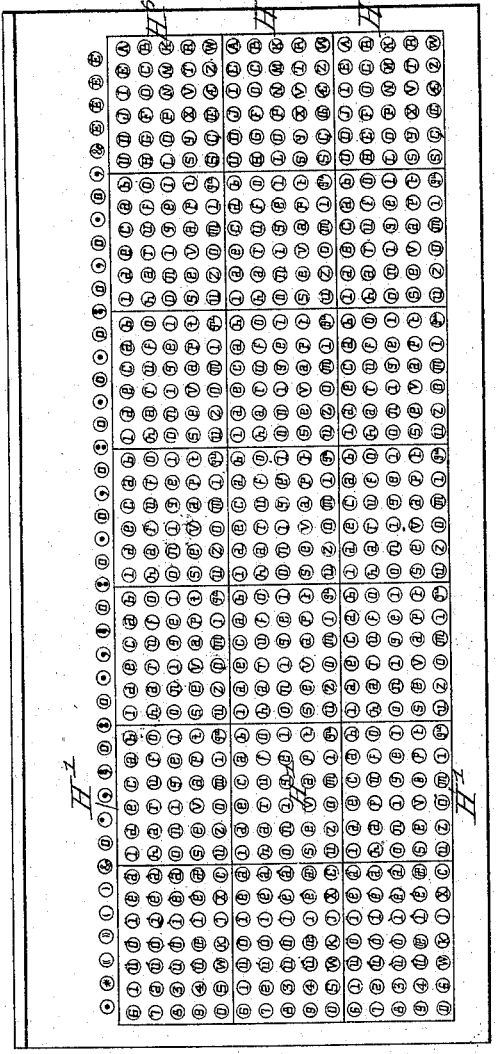
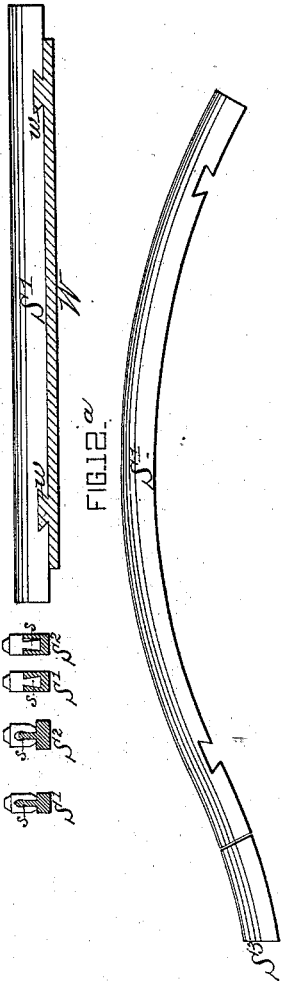
WITNESSES:
George Baumann
S. C. Connor
INVENTOR
Vincenzo Calendoli
BY
Howson & Howson
his ATTORNEYS.

(No Model.)  7 Sheets—Sheet 7.
V. CALENDOLI.
SIMULTANEOUS TYPE SETTING MACHINE.
No. 552,745. Patented Jan. 7, 1896.
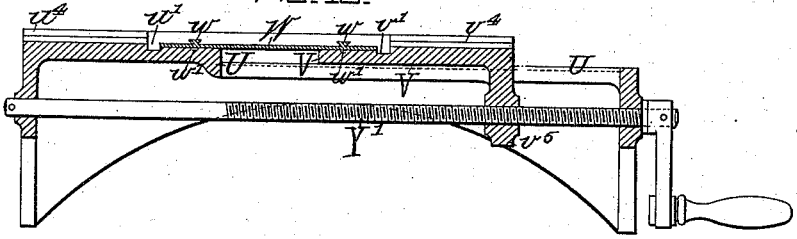
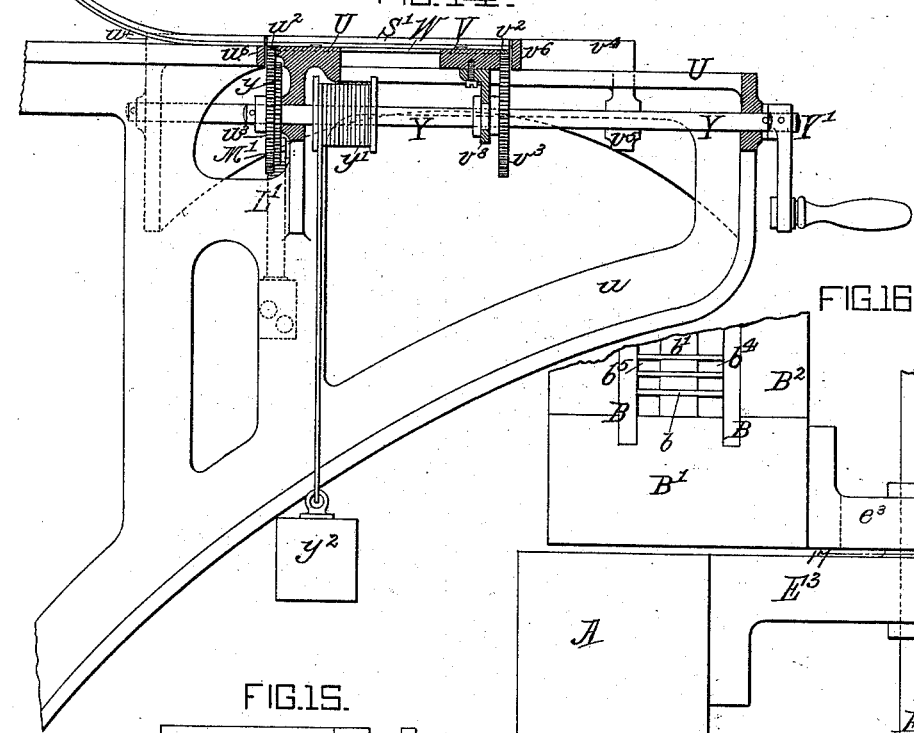
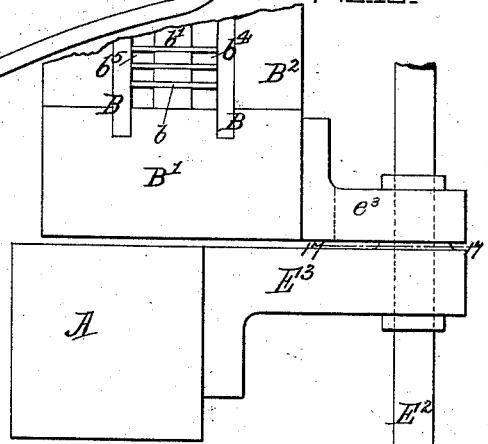
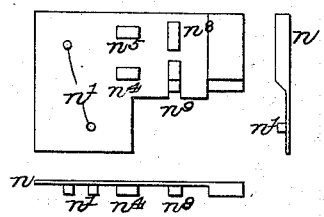
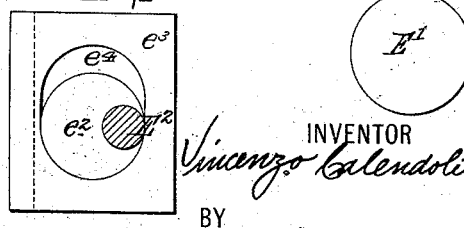
WITNESSES:
INVENTOR
BY
his ATTORNEYS

UNITED STATES PATENT OFFICE.

VINCENZO CALENDOLI, OF PARIS, FRANCE, ASSIGNOR OF ONE-HALF TO ANIELLO SAVARESE, OF SAME PLACE.

SIMULTANEOUS TYPE-SETTING MACHINE.

SPECIFICATION forming part of Letters Patent No. 552,745, dated January 7, 1896.

Application filed July 24, 1894. Serial No. 518,418. (No model.) Patented in Belgium May 4, 1893, No. 109,778; in France November 9, 1893, No. 233,939, and in Italy December 31, 1893, No. 35,238.

*To all whom it may concern:*

Be it known that I, VINCENZO CALENDOLI, a subject of the King of Italy, residing in Paris, France, have invented a new and useful Simultaneous Type-Setting Machine, (for which I have obtained a French patent, No. 233,939, dated November 9, 1893; an Italian patent, No. 35,238, dated December 31, 1893, and a Belgian patent, No. 109,778, dated May 4, 1893,) of which the following is a specification.

This invention has reference to an improved means for setting up type, which I shall herein describe by the term "simultaneous composition," and which is carried into effect by means of special arrangements, the main features of which may be stated as follows:

First. The type is set up in one continuous line which may be straight, curved, circular or of other suitable shape, either horizontal or inclined or occupying any other convenient position, each letter of the alphabet being repeated in such line a sufficient number of times to enable one or more words to be set up simultaneously.

Second. There is further provided a keyboard representing typographical characters so arranged, combined and repeated that the operator may readily touch the required characters with his fingers in the desired order of succession, so as to set up one or a series of words, according to requirements, and Third. The characters brought up to the line simultaneously under the action of the keyboard, and, although following each other in the required order of succession to form a given word or words, yet situated at some greater or less distance from each other, are eventually connected by any suitable means to form the required word or words.

The distinguishing features of the type are that the characters are much shorter than those of the ordinary type that has been in use hitherto; and, further, that their bodies are provided with means of attachment, either "male" or "female," adapted to fit a correspondingly but inversely shaped retaining portion of a support, (being male in the case of a female letter and female in the case of a male letter.) Type of this description will, moreover, admit of the employment of another kind of support, also either female or male, according to the construction of the characters it is to receive, but differing from the first-mentioned support in this particular, that it is unprovided with any retaining-piece, so that the characters may be placed thereon or removed therefrom by being shifted in the direction of their length or depth. This last-mentioned support serves to receive the characters from the setting-up machine, and also permits their removal and replacement for proof-correcting purposes. As to the first-mentioned support, it constitutes the "skeleton" or framework of the page, as it were, determining beforehand the position of all the lines of the page and permanently retaining thereon the characters that are set up. It should, however, be clearly understood that I do not wish to limit the scope of my invention to the employment of type of the construction just described, inasmuch as the same system is applicable, in case of need, both to ordinary type and to the usual method of arranging the set-up matter into pages. What is however more particularly characteristic of my system of typographical composition and forms the base thereof is the simultaneity of the process.

The invention will be best understood by reference to the accompanying drawings, in which I have represented, by way of example, various views of my improved simultaneous setting-up machine, constructed on the principles above enunciated; but it will be understood that the machine here shown is intended to be an example only, and that I fully reserve for myself the right to modify the operating mechanism, the details of construction, and the shapes and dimensions of all or any of the parts or devices constituting it, so long as the principle of the invention is not departed from.

In the drawings, Figures 1 and 1$^B$, taken together, represent the front view of the machine. Fig. 1$^a$ is a vertical section of parts of the mechanism for forming and correcting the set-up page on line 1 2, Fig. 1$^B$. Figs. 2 and 2$^B$, taken together, show a side elevation, and Fig. 3 a plan, thereof. Fig. 4 is a sectional side elevation representing in real size one of the parts of mechanism for closing the type receptacle or magazine. Fig. 4ª shows a modification of such mechanism. Fig. 5 is a view taken at an angle of ninety degrees to the preceding figure, showing part of the series of shutters constituting the closing mechanism. Fig. 6 is a horizontal section of parts of the type-magazine. Fig. 7 is a plan of the keyboard detached. Fig. 8 is a cross-section of the said keyboard. Fig. 9 is a detail view on an enlarged scale of one of the groups or sets of which the said keyboard consists. Figs. 10 and 11 represent a character in combination, respectively, with each of the two kinds of supports shown in cross-section. Figs 10ª and 11ª are views corresponding to Figs. 10 and 11, respectively, showing a modification of both the type and supports. Fig. 12 is an elevation of a straight supporting rail or rod, and Fig 12ª is an elevation of a curved supporting rail or rod. Fig. 13 is a vertical section, and Fig. 14 a side elevation on a larger scale, of the part carrying the making-up and correcting mechanism shown in Figs. 1 and 3. Fig. 15 shows a side elevation, plan, and side view of one of the plates supporting the shutters for closing the type-receptacles. Fig. 16 is a plan on a larger scale of a portion of the magazine, and Fig. 17 is a section through the line 17 17 of Fig. 16. Fig. 18 is a perspective view of a detail hereinafter referred to.

The machine primarily consists of a frame formed by two uprights or pillars A supported by legs $a$ at each end of the machine. The uprights are braced together in any suitable manner. This supporting-frame carries the complete machine, consisting of the following parts: The type case or magazine, the keyboard, the mechanism enabling to bring the characters corresponding to the keys of the board which have been depressed into one line simultaneously, and the apparatus for building up the page of the set-up type and correcting the typographical errors occurring therein.

1. *Type case or magazine.*—The type case or magazine consists of two large plates B B fitted in the grooves of the uprights B' B', which uprights are braced together by pieces $B^2$ or in any suitable manner, so as to form a frame. The magazine is divided in the vertical direction by partitions $b$, adapted to slide in grooves provided in the plates B, so that it consists of a number of compartments adapted to receive the characters superposed in vertical lines. Each of these compartments may, moreover, be subdivided into two or more chambers $b^4$ $b^5$ by additional partitions $b'$, to allow for two different sets of type, (say Roman characters on one side and italics on the other.) These sets of type are brought up in front of the line which is being set up by mechanism hereinafter to be described.

The magazine is movable in a horizontal direction, perpendicular to front of the machine, for which purpose it is supported, through the medium of horizontal rods $c\ c'\ c^2$, upon rollers C C' $C^2$, secured to the uprights A by means of brackets D D' $D^2$, adjustable upon the said uprights by means of screws $d$, $d'$, and $d^2$, so that the magazine may be well centered between the said uprights.

To enable the condition of the characters at the bottoms of their respective compartments to be ascertained, the two plates B B are adapted to slide in the uprights of the frame B' $B^2$. The following mechanism is employed for shifting these plates: Upon the upper brace of the frame there is arranged a lever E, terminating in an eccentric $e$, working within an eye formed in a plate $e'$, which is secured to the plate B. By causing the lever to describe an arc of ninety degrees in a plane parallel to the plate, this plate may be either raised or lowered. The same arrangement is repeated on the two plates, each of which may be operated independently of the other. The frame B' $B^2$ may also have a movement imparted to it, the object of which will be stated farther on. The direction of this movement is at right angles to the frame itself, and it is produced by mechanism very similar to that which has just been described, but operating in a plane at right angles to the plates. This mechanism comprises a lever E', Figs. 1, 2, 16, and 17, wedged or keyed upon a rod $E^2$, which turns in bearings or brackets $E^3$, secured to each of the uprights A, carrying at each end an eccentric $e^2$, working in an eye $e^4$, which is provided in a plate $e^3$, secured to each upright B' of the frame of plates B.

The lower portion of the type-magazine is inclined and toothed, the unequal width of the teeth corresponding to the width of the several vertical compartments containing the type, so that they may exactly fit the shutters F of the said compartments, and that too wide gaps are avoided.

A screw G, capable of being screwed into each of the uprights A, and the end of which bears upon the upright B' of the type receptacle or case, permits the adjustment of the position of such receptacle across the machine—$i.\ e.$, in the direction of its width.

2. *Keyboard.*—The keyboard of my type-setting machine is supported in front of the said machine by the legs $a$ of the upright members A of the frame. Its object is to bring into one line simultaneously all the characters necessary for setting up a given word or number of words, and it presents the following peculiar features:

The keyboard is composed of a series of groups H H' $H^2$, &c., each group being repeated many times in both directions of the keyboard. The groups are distinguished from each other by their different colors. The dimensions of the keyboard and the distances between the keys are so calculated that the fingers can strike simultaneously one or more complete words, containing from ten to fifteen letters all together. In each group of type the vowels and consonants alternate, either in the longitudinal or in the transverse direction, the preferred arrangement being that one vowel is incased or confined between four consonants. The keys being arranged sufficiently near each other, one consonant and any one of the four vowels surrounding it may be touched simultaneously with one finger, so that one movement of the finger is sufficient to set up a syllable.

Referring to Figs. 7 and 9, I have shown the principal groups divided into vertical sets, as follows: "i h o s u," "d a n e r," "e r i v o," "c u g a m," "a f e p i," and "b o l t qu." These precise combinations, however, are only shown by way of example, as the combinations may be varied to suit different languages.

The type-compartments $b^4$ and $b^5$ of the magazine are arranged across the machine. The set of compartments in use, say those lettered $b^5$, are directly above the rod S. (See Fig. 4.) These type-compartments are arranged in respect to the keys of the keyboard, as follows: Considering, for instance, the three sets H' H' H', Fig. 7, the key in the upper right-hand corner of each is lettered "b," and each of these keys, which are directly above each other, are connected to mechanism for operating one type-case only, as shown in Fig. 8, and explained farther on. This is the same with all of the other keys. The three keys of the same denomination that are in the same vertical line (looking at Fig. 7) are connected to one and the same type-case mechanism.

Referring to Fig. 9, the keys in each vertical line are connected to groups of the type-cases, as follows: Taking, for example, the third vertical line from the right-hand side of Fig. 9, the keys in the uneven horizontal lines—the first, third, and fifth, for instance—"m, g," and "c" are connected to a group of type-cases which for convenience I will letter $k$, and the keys in the even horizontal rows, "a" and "u," are connected to another group which is lettered $k'$. In the example shown, the group $k$ is connected to a line of type-cases above the rod S ahead of the cases to which the group $k'$ is connected, so that instead of the type-cases being placed in the order of the keys "c, u, g, a, m" they are placed thus—"c, g, m, u, a," starting from the left of Fig. 1. This arrangement is made with each vertical line of the keyboard. Furthermore, the groups $k\,k'$ of a vertical line always precede the groups $k\,k'$ of any vertical line to the left. For example, the key "g" being in an odd horizontal row, Fig. 9, will release its type before the key "u" or "a" in the even horizontal rows, and before the key "i" in the vertical row to the left, but after the key "e" in the vertical row to the right. Therefore, with a single finger, without appreciable movement any one of the syllables "gu, ga, gi, eg" may be struck. This arrangement greatly facilitates the manipulation of the keyboard.

In the type-magazine, the type is arranged in consecutive series, such as K, Fig. 9, each of which corresponds to a group, repeated several times over across the machine, as at H' H' H', for example.

It should be noted that the capital letters form a separate set in the keyboard, such set being reproduced three times in the transverse direction, as at $H^6\ H^6\ H^6$, similarly to the other groups of letters above referred to. The group $H^6$ of capitals also has a group corresponding to it in the type-magazine, and it will, moreover, be understood that, if necessary, there may be a number of such groups or sets of capitals. Again, those characters which are seldom used, such as "k," also form a separate group H, reproduced three times as is the group of capitals. The spaces and stops may be distributed in one line $i\,i$ on one edge of the keyboard, Fig. 3. These spaces and stops are also inscribed upon the keys $i'$ operated by a set of pedals $l$. The keys of the line $i\,i$, as well as the keys connected with the pedals, correspond to a second series in the type magazine or case.

3. *The type-operating mechanism.*—In order to transmit motion from the keys of the keyboard, as they are depressed, to the several compartments of the magazine, so as to cause the characters to leave the said magazine in the required order of succession to form the word or words to be set up, we preferably employ electrical motion-transmitting apparatus, such as we will here describe by way of example. It should, however, be clearly understood that other transmission-gearing of any suitable kind, such as lever mechanism, may be employed without departure from the principle of the invention. This apparatus consists of a series of parts which are all identical with each other and which correspond each to a compartment of the type-magazine, Figs. 4, 5, and 6. The mechanism mainly consists of a series of sliding shutters, such as F, Fig. 4, each operated by an electromagnet L through the medium of an arrangement of transmitting-levers. The electromagnets are arranged into a number of series or groups supported respectively by the cross-pieces $L^2$ of the main frame of the machine. One end of the wire of each electromagnet is connected to three contact-pieces $l\,l\,l$, Fig. 8, corresponding to the same letter in each of the repeated groups of letters H H H, H' H' H', $H^6\ H^6\ H^6$. The other end of the wire leads to a battery, whence starts another wire leading to a copper plate $l'$ extending over the whole of the keyboard and making electrical connection with all the keys. It is therefore only necessary to depress any one of the keys to close the circuit of the corresponding electromagnet. As shown in Fig. 8, the contacts are arranged in sets of three, each corresponding to the same electromagnet, so that by depressing any one of the corresponding three keys (say the key of the letter "b") the current is sent through the same electromagnet. It is therefore immaterial what letter is touched in any one of the three superposed groups or sets. The same electromagnet will in each case be operated, and in each case, too, the same compartment of the magazine will be opened. As stated, this arrangement has been adopted in order to facilitate manipulation, while reducing at the same time the number of electromagnets and magazine-compartments to be operated. Some of the wires and their contacts are arranged just underneath the keys, Fig. 8. As to the other wires, their contacts are provided with crank-shaped extensions, Fig. 9, also terminating below the corresponding keys.

The mechanism which serves to transmit the action exercised upon each group of three keys and upon the corresponding electromagnet to the corresponding magazine-compartment is constructed as follows: In front of each electromagnet L there is arranged an armature M, pivoted to a fixed pin $m$. Through the opposite end of the armature there passes a screw-threaded rod $m'$, having a milled nut $m^2$ screwed onto it, on which bears the end of the armature M, the said nut $M^2$ serving to adjust the extent of motion of the armature M. The rod M' is pivoted at $m^3$ to one of the arms of the three-armed lever N, turning on a pivot $n$ which projects from the plate $n$, Figs. 5, 6 and 15. The two other arms of the lever N carry studs $n^2$ and $n^3$, entering extended or elongated eyes provided in the slides F F'. These slides are guided by projections or lugs $n^4$ $n^5$, as they perform the longitudinal movement imparted to them by the lever N, the said lugs projecting from the plate $n$ and engaging in extended slideways $f$ $f'$, provided in the said slides F F'. These slides F F' terminate respectively in tappets $f^3$ $f^4$, one of which, $f^3$, is slightly beveled at the top for the purpose hereinafter to be specified, and the spring R, secured to each of the plates $n$, constantly tends to force back the slide F' and consequently to push the slide F forward, thereby counteracting the action of the electromagnet. The series of plates $n$ and slides F F' are carried by an inclined cross-piece forming part of the main frame of the machine, in the grooves $n^6$ of which the said plates $n$ are embedded. That cross-piece also carries an inclined rod or rule S, following the incline of the magazine bottom. There are as many parts, such as $n$ F F', placed side by side as there are compartments in the type case or magazine taken in the direction of its length. As to the electromagnets, there being some difficulty in arranging them beside each other on account of their size, they are arranged in several superposed series or rows, Fig. 1, all corresponding to the single series of parts or devices $m$ F F', placed side by side. To form the connection between the several series of electromagnets and the series of devices just referred to, it is only necessary to vary the length of the rod $m'$ according to the level on which the series of electromagnets to be connected is situated.

To insure a perfect closing of the lower orifice of each magazine-compartment by the corresponding slide F, the lower edge of each of the two plates B of the magazine is provided with saw-teeth or ribs, Figs. 1, 5 and 18, comprising horizontal ribs $b^2$ and vertical ribs $b^3$. The horizontal ribs are unequal in length, their size corresponding to the width of the particular compartment to which they belong, the size of which compartment varies in its turn according to the width of the body of the letter. Against these horizontal ribs the shutter F is arranged to slide, as shown in Fig. 18, which is a perspective view of a portion of the back plate B, a shutter F, and a plate $n$.

The characters X, the construction of which is based upon the principle stated in the introductory part of this specification, are provided with a groove $x$, the innermost portion of which is wider than the portion nearest to its edges. Besides, one of their lower edges is beveled, as at $x'$, its incline corresponding to that formed on the tappet or nose $f^3$ for a purpose hereinafter to be specified.

The operation of the mechanism is as follows: We will suppose that the type-magazine has been shifted on its rollers C C' $C^2$ by means of suitable mechanism enabling it to be displaced laterally, so that one set of compartments—we will say the set $b^5$, containing the Roman characters, (the set $b^4$ containing Italic or Gothic characters)—is situated above the rule S intended to receive the type, Fig. 4. The word or words to be set up are formed by acting upon the keyboard with all the fingers of the hand at once. The electromagnets corresponding to the depressed keys immediately attract their armature with the result that the tailpiece N of each of the treble levers that are operated is depressed. The consequence of this lowering of the lever-tails is a backward movement of the slide F, which therefore opens the corresponding compartment, and a forward movement of the slide F', which thus retains the column of characters the uncovering of the compartment has allowed to descend. When the hand of the operator is lifted off the keyboard, the armature M ceases to exercise its attractive power, and the spring R imparts to each of the slides F F' a movement in a direction opposite to that which it had just completed before. The slide F advances, and its nose or tappet $f^3$, with its incline, meets the corresponding incline $x'$ of the second character of the column. The two inclines slide one upon the other, and the whole of the column rises again, with the exception of the first letter, which rests upon the nose $f^4$ of the slide F'; but, owing to the backward movement of the said slide F', that letter is released, and, in descending, takes up its position astride the rule S, which thus receives all the characters corresponding to the keys of the keyboard which the fingers of the operator have just abandoned. The characters then slide along the inclined rule S, in consequence of its sloping position, and gather at the bottom of the slope in the proper order and with the required spaces between them.

I would furthermore point out that the mechanism operating the slides F F' and causing the type to descend, as required, may be modified in any suitable manner. As shown, in Fig. 4ª, for example, the action of the upper slide F may be altered, and it may be caused to act on the center or on either side of the character it is desired to retain, instead of allowing it to act upon the base or bottom thereof. For this purpose the space between the noses or tappets $f^3 f^4$ may be increased so as to be greater than the depth of an individual piece of type and about equal to one letter and a half.

It will be seen that in the magazine-shutter-operating mechanism the descent of the type does not take place before the fingers are lifted off the keys—i. e., the type does not descend while the keys are being depressed—the advantage of which arrangement is very valuable in this respect: A certain amount of hesitation may in some cases retard somewhat the selection of the proper characters of which a given word consists, and if the characters were to drop immediately the keys are depressed they would do so in the order of succession in which the operator touched the corresponding keys, and not in the order in which the letters should properly succeed each other in the particular word to be set up. No such hesitation can exist, however, at the time of the release of the keys, and inasmuch as this release may in all cases be simultaneous all the characters must of necessity drop together and therefore assume their positions in the proper order. Obviously where the rod S is horizontal no such inconvenience will be experienced.

4. *Making-up and correcting mechanism.*— This mechanism is located on one side of the type-setting machine, at the foot or base of the bar or rule S, whereon the type is dropped, Figs. 1ª, 3, 13, and 14, and it is preferably constructed as follows:

The mechanism is supported by a bracket $u$, secured to the machine-frame and carrying at its upper part a stationary horizontal frame U, whereon a movable piece or carriage V is adapted to slide. The two pieces V and U are provided each with a groove $u' v'$ extending over the whole length of the apparatus. In each of these grooves a rack with a double row of teeth $u^2 v^2$ is adapted to slide. Between the teeth of the upper row there are inserted a series of rods or rails S', Figs. 10 and 14, whose shape in section is the exact counterpart of the groove $x$ provided in the body of the characters X. The lower row of teeth of each rack is in gear with the toothed wheels $u^3 v^3$ mounted upon a shaft Y operated by an escapement shown in Fig. 1ª and hereinafter described.

The stationary part U and the movable part V of the mechanism respectively carry plates $u^4$, $v^4$, called "false pages," and serving for correcting the set-up matter. Upon these plates there are arranged series of rules $S^2$ of the shape in section which is shown in Fig. 11. These rules or rods are placed side by side and so compressed that the distance between their axes is exactly equal to the distance between the axes of the rods S' placed upon the racks $u^2 v^2$. Besides, these rods $S^2$ are situated on the same level as the rods S'.

It has already been stated that one false page $u^4$ forms part of the stationary frame U of the making-up attachment. As to the other false page, $v^4$, it appertains to the movable device or carriage V. The distance between the carriages $u^4$ and $v^4$ determines the width of the page. To enable this distance to be varied in accordance with the width of the page to be set up, there is provided a crankshaft Y', Fig. 13, so mounted in the stationary frame U that it may revolve but cannot be displaced longitudinally. This shaft is screw-threaded for a portion of its length, which threaded part engages in a nut or tapped hole provided in the projection or bracket $v^5$ located underneath the movable plate $v^4$. It is only necessary to act upon the crank of the said shaft Y' to move the carriage V upon the frame U and to vary thereby the distance between the false pages $u^4 v^4$. The rails or rods S' carried by the respective upper rows of teeth of the racks $u^2 v^2$ are retained between flanges $u^6 v^6$ projecting, respectively, from the stationary frame U and from the movable piece or carriage V. The distance between these flanges is the same as the distance between the false pages $u^4 v^4$, and consequently the length of the rods S' is equal to or a little less than that distance. The flange $u^6$ is slotted or notched at $u^7$ to afford a passage for the extension $S^3$ of the rod or rule S whereon the type descends. This extension has a suitable curve to insure coincidence between the rule S and the end of each of the rails S' as they come up flush with it in their forward movement. The racks may be caused to advance in the direction of the arrow, Fig. 3, by any suitable means, the following being preferred: In the extension $S^3$ of the line the frame U and the carriage V are respectively notched or slotted in front of the racks $u^2 v^2$, so as to afford a passage for the gear-wheels $u^3 v^3$, engaging respectively with the racks $u^2 v^2$, as above stated. (See Fig. 14.) The wheel $u^3$ is rigidly secured on the shaft Y which in its turn is mounted upon the frame U. As to the wheel $v^3$ being compelled to follow the carriage V as it moves to and fro, it carries a collar retained in a fork $v^8$, arranged at the base of the carriage V, so that this fork carries the said wheel $v^3$ along with it when the carriage is set in motion, while at the same time allowing the said wheel to revolve. The shaft Y is provided with a groove or any other known or suitable means for causing the said wheel $v^3$ to participate in the rotary motion of the said shaft, while permitting it at the same time to move upon the said shaft. The mechanism employed for operating the above-mentioned gear-wheels comprises a ratchet-wheel $y$ keyed onto the shaft Y and a drum or pulley $y'$, on which is wound a cord carrying a weight $y^2$, and it further comprises an electromagnet L' with an armature M' similar to the mechanism operating the shutters. This electromagnet is set in operation by one of the keys $i^2$ of the pedal-keyboard, so as to operate a pallet $y^3$, Fig. 1ª, adapted to turn about a fixed pivot $y^4$, and which, in combination with the ratchet $y$, constitutes an escapement, which, under the action of the weight $y^2$, releases one tooth of the ratchet-wheel $y$ at each oscillation of the armature M'.

Before describing the general operation of the making-up and correcting mechanism, it remains to describe the apparatus permitting the type which has dropped upon the rule S to be pushed onto the successive rails or rods S' of the making-up mechanism. This apparatus consists, as shown in Figs. 1 and 2, of nippers Z, the pivot-joint $z$ of whose arms or cheeks is arranged upon a lever $z'$, adapted to turn about a screw $z^2$, which thus forms the pivot or fulcrum of that lever, and which, for the purpose, is implanted in one of the uprights A of the machine. This screw $z^2$ is so tightened that there is a slight friction between the lever $z'$ it carries and the adjoining upright A. The said screw $z^2$ being the fixed pivot of the lever $z'$ is also the point at which is first bent the rule $z^3$. The ends of the jaws or cheeks of the nippers Z are connected with the rod $z^4$ through the medium of small links $z^5 z^5$, one end of each of which is pivoted to the end of the nipper-jaws, while the opposite end is linked to the rod $z^4$. This rod $z^4$ is connected by its lower end to the set of pedals, capable of turning on the pivot I'. A spring $z^6$ tends to cause the rod $z^4$ constantly to rise, and consequently to raise also the pedals. Another spring $z^3$ assists in thus raising the pedals, and the rod $z^4$ is, besides, provided at its upper end with an extension $z^7$, which bears on a point situated below the pivot $z$ of the nippers Z, so as to limit the distance between the arms or jaws of the nippers owing to the push exercised upon the links $z^5$ by the spring $z^7$, and thereby cause the said nippers to rise again to their upper position.

The complete making-up and correcting mechanism operates in the following manner: After a certain number of characters have dropped down and descended along the rule S, the pedals are depressed and the rod $z^4$ is acted upon. This movement may be performed at the same time as the pedal-key $i'$ is depressed. For this purpose the spring of each of the pedal-keys is made less powerful than the springs $z^3$ and $z^6$ taken jointly, so that the key $i'$ is first lowered, thereby causing the corresponding space or stop to drop out of the type-magazine, and then the pressure with the foot is continued for the purpose of lowering the pedal to the full extent. The action produced upon the connecting-rod or pitman $z^4$ results in a double movement of the nippers. (a) They first close, owing to the resistance which is due to the friction taking place between the lever $z'$ and the upright A, and (b) after closing upon the characters situated at the top of the curved rod $s^3$ they are caused, by the pull exercised upon the rod or lever $z^4$, to surmount or overcome the friction of the said lever $z'$ against the upright and to turn about a fixed pivot $z^2$, carrying along with it the type which follows its curvilinear course. When the pedals are released, the nippers also perform a double movement, but in the opposite direction. The spring $z^6$ causes the rod $z^4$ to rise, which rod, through the medium of the links $z^5$, opens the jaws of the nippers, which for the time being are still retained in place by the friction of the lever $z'$ against the upright. The extension $z^6$ of the rod $z^4$ then meets and bears upon the pivot-joint of the nippers and causes them to return to their normal position without holding any type between their jaws. The nippers $z$ might in case of need be dispensed with by inclining the rails or rods S' of the making-up mechanism more or less, or even arranging them vertically. The type would then be strung together upon such rods S' by virtue of their own weight, similarly to what takes place upon the rule S. To make up a page of type, the racks are brought to the rear end or rearmost limit of their backward stroke, so that the first rail or rod they carry comes up against the rule S³ carrying the characters, which are passed on to such rule under the action of the nippers Z. When the operator finds that the first rail or rod is filled with type, he sets in operation the escapement, which moves forward the racks the distance of one tooth, when the second rail will take up its position opposite to the rule S³. This second rail or rod is then, like the first, filled with type, and the operation is further continued in the same manner. The rails or rods S' are provided with dovetailed notches, Fig. 12, which, owing to the advanced motion of the rails and racks moved onto ribs $w$ of corresponding shape, formed upon a plate W of a width equal to the distance between the false pages, minus the width of the two grooves $u^2 v^2$. This plate is secured in any suitable manner, say by means of pins or studs $w'$, to the carriage U and the frame V and serves as a support for the set-up page after it has been made up and corrected.

To correct misprints, it is only necessary, while the page is inclosed between the false pages $u^4 v^4$ to push out of the way, to the right and left, the fractions of lines containing the errors, so that the type of which these fractions consist passes on to the small rules or bars $S^2$ of the false page, situated opposite to the rails $S'$ of the lines to be corrected or altered.

Owing to their peculiar shape, which has been delineated in the introductory part of this specification, the characters may be readily removed from the rules unprovided with the retaining flange or shoulders $s$. They can then as readily be replaced by the correct letters, as will be understood, and when the erroneous portions of the lines have been duly corrected or altered they are moved back on to the corresponding rail of the page, where they are permanently retained by the enlarged or flanged portion $s$.

After setting up and correcting the whole page, spaces may, if necessary, be inserted between the rails, after which the plate W is removed from the apparatus along with the rails or rods it carries, and these are tightly compressed together, (with or without spacelines between them,) whereupon the page, being finally made up, is in a condition to be taken to press.

It will be understood, that, as we have already pointed out in the introductory statement, the shape of the type X and the type-supports S $S'$ $S^2$ may be varied at will. Thus, for example, Figs. $10^a$ and $11^a$, it may be assumed that the characters terminate at their bases in a dovetailed projection or rib, forming what has been termed "male" letters, the corresponding supports being provided, or not, as may be required. In fact, any other arrangements answering the same purpose may evidently be employed instead of the construction specially referred to, as has already been pointed out in my previously-mentioned application cited in the early part of this specification.

I must not omit to point out, too, that my improved type-setting machine enables pages of type of curved shape or outline to be made up. For this purpose it is sufficient to replace the straight rods $S'$, Fig. 12 by curved rails or rods such as shown in Fig. $12^a$. The making-up and correcting mechanism remains practically unaltered, it being only necessary to substitute a curved plate for the plane one, and to arrange the false pages in planes tangential to the curved surface. The rule $S^3$ should in that case assume the shape of an S, so as always to form two arcs, one tangential to the rule S and the other tangential to the curved rails $S'$. The formation of such curved pages offers the great advantage of enabling pages to be set up in the required shape to be directly applied to the rollers of rotary printing-machines, whereby the necessity for stereotyped castings is obviated. I will also mention that although simultaneity of composition is the primary object and fundamental principle of my invention, it is clear, nevertheless, that any person preferring to operate the keys of a keyboard, constructed substantially like mine one by one in succession, instead of simultaneously, must be considered as making use of improvements embodied in my invention; and it will also be understood that what I desire to have protected by Letters Patent is the complete machine and all its improved parts or devices, taken either jointly or severally, with the possibility of varying the dimensions of the keyboard and magazine, so that, should it be desired to apply some of the improvements to successive instead of simultaneous composition, the keyboard and type-magazine, for instance, may be arranged to comprise one alphabet only, which for successive setting up is the most practical arrangement.

I claim as my invention—

1. In a typesetting machine, the combination of a type magazine having compartments for the different type, and a rod following the line of the orifices of the type and adapted to receive the type, with a keyboard comprising a series of repeated letters and groups of letters, and transmission mechanism connecting several corresponding keys of the keyboard to each of the compartments, substantially as set forth.

2. In a type setting machine, the combination of a type magazine provided with compartments containing the same type repeated several times, and having the openings of the type compartments arranged in line, with a key-board comprising a series of repeated letters to enable different groups of letters or single letters to be touched simultaneously, and operating mechanism between the keys and the type compartments so arranged as to cause the type necessary for the formation of a given word or words to issue simultaneously and in the required order in one line, substantially as set forth.

3. In a typesetting machine, the combination of a type magazine provided with compartments containing the same type repeated several times, and having the openings of the type compartments arranged in line, and a guide for the type below the openings, with a key-board, operating mechanism between the keys and the type compartments so arranged as to cause the type necessary for the formation of a word or words to issue simultaneously and in the required order, and means for collecting the type in the required order and carrying them along the guide, all substantially as and for the purposes set forth.

4. In a typesetting machine, the combination of a type case or magazine divided into one or more series of compartments containing type, in the body of which there is provided a groove or recess, with an inclined rod following the line of the orifices of the said compartments, whereon the pieces of type are adapted to drop astride, as the corresponding compartments of the type case open, the characters adapted to slide along, on the said inclined rod, substantially as described.

5. In a typesetting machine, the combination of a type magazine provided with compartments containing type, the openings of the said compartments being in line, and an inclined rod following the line of the orifices of the said compartments, and adapted to hold and guide the type downward to collect the type dropped, with a keyboard and operating mechanism between the keys and the compartments of the type magazine, substantially as and for the purposes set forth.

6. In a type setting machine, the combination of a type magazine, a keyboard, operating mechanism between the keys and the magazine, and a guide for the type as it leaves the magazine, with making-up mechanism consisting of a stationary frame and a movable device adapted to slide upon the frame to vary the width of the page, racks adapted to slide on the movable device and the stationary frame, the said racks carrying supporting rails for the type, and means for moving the racks to bring the said supporting rails in line with the said guide for the type, substantially as set forth.

7. In a typesetting machine, the combination of a type-magazine, a keyboard, operating mechanism between the keys and the type-magazine, and a guide for the type as it leaves the magazine, with making-up mechanism, consisting of a frame, movable racks thereon, the said racks carrying supporting rails for the type, means for moving the racks to bring the rails in line with the said guide, and false pages at the sides of the made up page provided with rails coinciding with the rails on the rack for correcting purposes, substantially as set forth.

8. In a typesetting machine, the combination of a type magazine having compartments for the type, and a key-board having a plurality of keys bearing the same letter, with operating mechanism for each compartment, each such mechanism being connected to, and adapted to be actuated by several keys bearing the same letter, substantially as described.

9. In a typesetting machine, the combination of a type magazine, having compartments for the type, and a keyboard having a plurality of keys bearing the same letter, with electro-magnetic motion transmitting mechanism between the keys and the compartments for the type, the electro-magnet controlling each compartment being electrically connected to a plurality of keys bearing the same letter, substantially as and for the purposes set forth.

10. In a typesetting machine, the combination of a type magazine and a guide for the type as it leaves the magazine, with a lever mounted in slight frictional contact with the frame of the machine, nippers pivoted to the said lever, the jaws of the said nippers adapted to move along the said guide, a spring controlled rod, links connecting the arms of the said nippers to the said rod whereby when the rod is depressed the nippers close upon the type on the guide and move along the guide, and when the rod is released open and move back, the said rod being under the control of the operator, substantially as set forth.

11. In a typesetting machine, the combination of a magazine having type compartments, a guide rod beneath the type compartments and type, the said guide rod and type having corresponding projections and recesses whereby the type will fall on the guide rod and be adapted to slide thereon, with making-up mechanism comprising a stationary frame, a movable device, rails carried by the movable device and having projections and recesses corresponding to the type whereby the type may be slid onto the rails from the guide rod but unable to be removed from the rails in any other direction but longitudinally, means for bringing the rails one at a time to register with the guide rod, and false pages at the sides of the movable device beyond the guide rod, the said false pages comprising rails adapted to allow the type to slide longitudinally thereon and be supported thereby while leaving the type free to be lifted off therefrom, substantially as set forth.

In testimony whereof I have signed my name to this specification in the presence of two subscribing witnesses.

VINCENZO CALENDOLI.

Witnesses:
 CHARLES DONY,
 EDWARD P. MACLEAN.